(No Model.)

A. REESE.
APPARATUS FOR CONTROLLING THE SUPPLY OF FLUIDS THROUGH PIPES.

No. 341,170. Patented May 4, 1886.

Witnesses.
J. G. Kay
J. Cooke

Inventor.
Abram Reese
By James F. Kay
Attorney

N. PETERS, Photo-Lithographer, Washington, D. C.

UNITED STATES PATENT OFFICE.

ABRAM REESE, OF PITTSBURG, PENNSYLVANIA.

APPARATUS FOR CONTROLLING THE SUPPLY OF FLUID THROUGH PIPES.

SPECIFICATION forming part of Letters Patent No. 341,170, dated May 4, 1886.

Application filed October 3, 1884. Serial No. 144,617. (No model.)

*To all whom it may concern:*

Be it known that I, ABRAM REESE, of Pittsburg, in the county of Allegheny and State of Pennsylvania, have invented a new and useful Improvement in Apparatus for Controlling the Supply of Fluid through Pipes; and I do hereby declare the following to be a full, clear, and exact description thereof.

My invention relates to pipe-lines for supply water, gas, and other fluids, its principal object being to provide apparatus for controlling the delivery or supply of natural or manufactured gas to manufactories or dwellings for consumption, so that the amount supplied may be regulated by a valve or cock in the pipe-line, and that valve or cock may be locked so that it cannot be disturbed by the consumer, thus giving the party furnishing the gas full control of the amount supplied.

It consists, essentially, in a valve for pipe-lines, having two disks extending across the same, one disk provided with a hole large enough to allow the passage of the highest pressure desired and the other disk provided with a series of holes of different sizes arranged in a circle and adapted to register with the hole in the first disk, so that by turning one disk the amount of gas passing through the valve at the pressure of the main pipe can be accurately regulated.

It also consists in combining with the valve having the two disks annular rings adapted to inclose the valve and a lock to secure the rings in position and prevent access to the valve.

It also consists in other improvements, as hereinafter specifically set forth.

In further describing my invention, I will refer to the accompanying drawings fully illustrating the same, in which—

Figure 1:
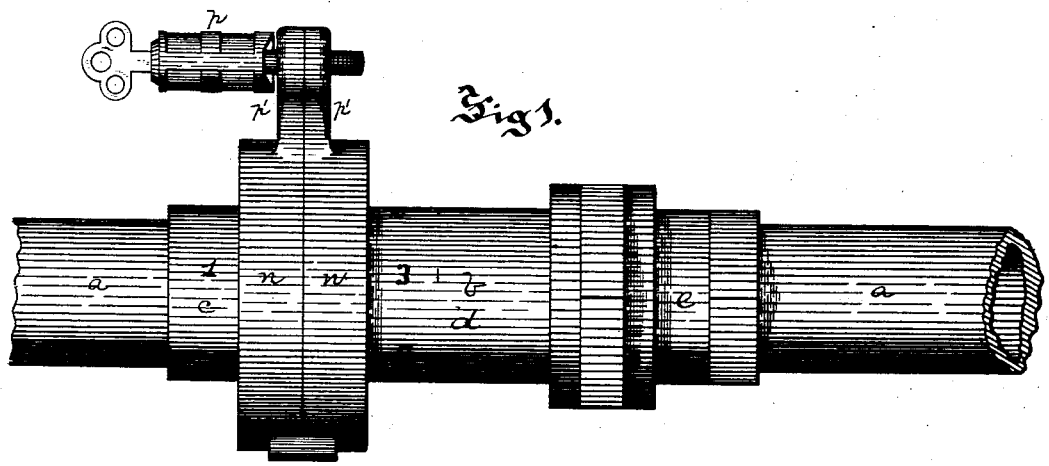
Figure 2:
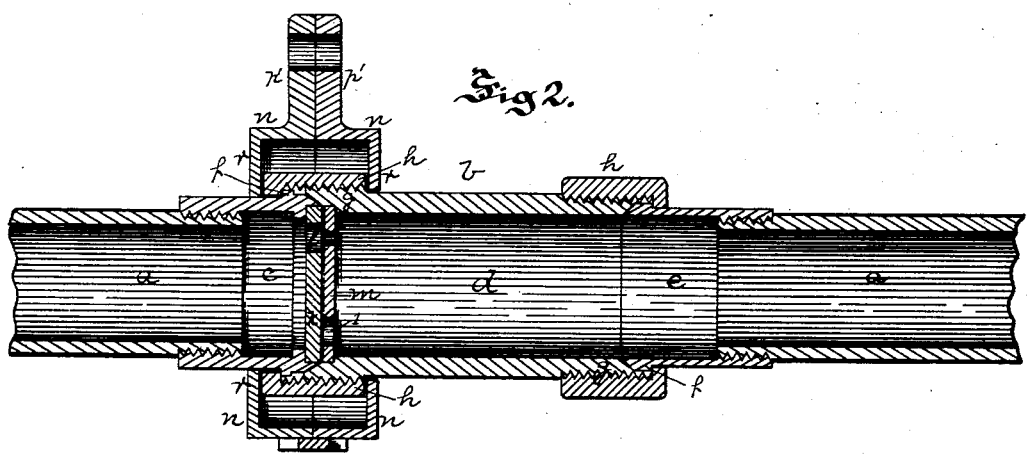
Figure 4:
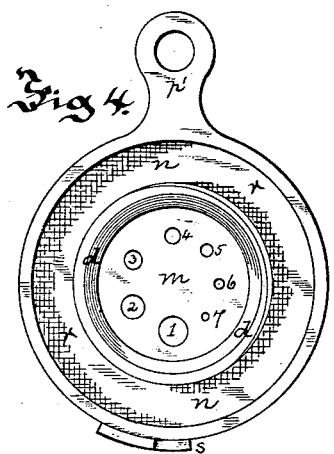
Figure 5:
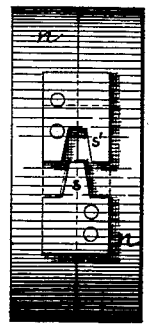
Figure 3:
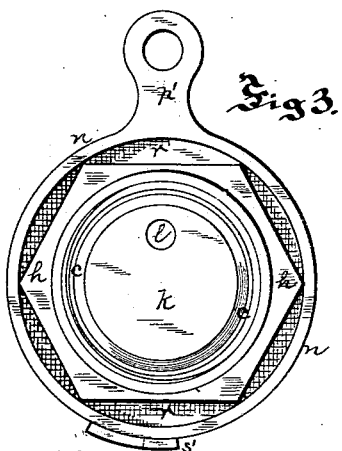

Figure 1 is a side view of a valve and pipe-line, showing the most approved form thereof. Fig. 2 is a vertical longitudinal section. Fig. 3 is a face view of part of the valve, showing one disk. Fig. 4 is a like view showing the other disk. Fig. 5 is a base view illustrating the connection of the inclosing-rings.

Like letters of reference refer to like parts in each.

My invention is generally employed in connections leading from the gas-main into the manufactory or dwelling, the connecting-pipes $a$ being the ordinary wrought-metal pipes employed for that purpose. The valve $b$ is secured within the pipe-line at any point easy of access.

The valve is generally made in three parts, $c$ $d$ $e$, the parts $c$ and $e$ being screwed onto the pipes $a$ of the line and connected to the part $d$ by beveled joints, ground to prevent leakage, the parts $a$ $e$ each having annular rings $f$ extending around them, and the screw-rings $h$, fitting over them and against the rings $f$, and screwing onto threaded ends $g$ of the part $d$, thus securing the parts of the valve together. The valve is constructed in three parts to permit of the turning of the part $d$ to regulate the flow of gas passing through the valve, as hereinafter described, as the part $d$ is free to turn when the rings $h$ are unscrewed.

Extending across the ends of the tube $c$ is the disk $k$, this disk having the hole $l$ extending through it close to the edge of the disk. The hole $l$ is sufficiently large to permit the passage of the largest amount or highest pressure of fluid desired in the manufactory or dwelling to be supplied, so that when the flow of gas through this hole $l$ is unobstructed the full amount of fluid is supplied through the line.

At the end of the tube $d$ is the disk $m$, which fits against the disk $k$, the faces of the disks being ground to prevent leakage of gas between them. In the disk $m$ are a series of holes arranged in a circle, so as to register with the hole $l$ in the disk $k$, these holes being of different sizes, the hole 1 being the same size as the hole $l$, and when registering with it forming no obstruction to the flow of the fluid through the disks; but the other holes, numbered 2 3 4 5 6 7, according to the number employed, decreasing in size, so that when registering with the hole $l$ only the amount of fluid capable of passing through the hole in the disk $m$ that the pressure in the main line can pass through the valve, the amount of fluid delivered through the valve being thus regulated or controlled by the size of the hole in the disk $m$ registering with that in the disk $k$. On the outer surface of the tubes $c$ $d$ in line with the holes in the disks are figures corresponding with these holes, and to regulate the flow of the fluid through the valve the rings $h$ are unscrewed, leaving the tube $d$ free to turn, and the tube is turned until the proper figure thereon registers with the figure on the tube $c$, and the tube $d$ then secured firmly in that position by screwing up the rings $k$.

As the pressure in the main-pipe line is higher than the pressure or amount to be delivered in the line controlled by the valve, though the openings through the disks are much smaller than the pipe-line, still a sufficient pressure for the manufactory or dwelling can pass through, and a low-pressure supply can thus be obtained from a high-pressure main, and where the valve is employed with lines for natural gas all the danger of taking a supply of gas from a high-pressure main is overcome.

Where the pressure within the main rapidly increases, as sometimes happens in natural-gas lines all danger in the auxiliary line leading from it is overcome as the pressure in the auxiliary is but little affected thereby. Where, also, the gas is charged for according to the amount of pressure supplied, the valve can be employed to regulate that supply and all necessity for a meter is overcome, the party furnishing the supply setting or regulating the valve accordingly.

To prevent tampering with the valve after it is set it is protected by the rings $n$ $n'$, which fit around the pipe and prevent movement of the valve, the rings inclosing the valve entirely and being locked in position by the padlock $p$ passing through the loops $p'$ in the rings. The rings fit over the screw-ring $h$, and are provided with the flanges $r$, extending down to or close to the body of the tubes $c$ $d$, and to prevent their being spread apart to obtain access to the screw-ring $h$ to unscrew it, and thus move the valve, they are connected by the tongue-and-slot joint at the base, the tongue $s$ fitting into the slot $s'$, and so forming a joint which can only be opened by sliding one ring on the other when the padlock $p$ is removed.

After the supply through the valve has been regulated, as before described, the rings are connected at the base by the tongue-and-slot joint and the padlock $p$ passed through the loops $p'$ and locked, and the valve cannot be opened until the rings are removed.

The disks $k$ $m$ are preferably cast with or rigidly secured to the tubes $c$ $d$; but one or both may be loose, and after they are turned to register with each other, as before described, the two tubes are bound firmly together by the screw-ring.

What I claim as my invention, and desire to secure by Letters Patent, is—

1. In valves for pipe-lines, the tube $c$, having the disk $k$, provided with the hole $l$ and of sufficient diameter to permit the passage of the highest pressure desired, in combination with the tube $d$, having the disk $m$, provided with holes of different diameters adapted to register with said hole $l$ in the disk $k$ on the turning of one of the tubes, substantially as set forth.

2. In valves, the combination of the tube $c$, having the disk $k$, the tube $d$, having the disk $m$, said disks having holes of different diameters, and the tube $e$, said tube $d$ being connected to the tubes $c$ $e$ by screw-ring joints, substantially as and for the purposes set forth.

3. In combination with the valve $b$, the rings $n$ $n'$, inclosing the valve, and having the tongue-and-slot joint at the base, and the loops $p'$, and the padlock $p$, substantially as and for the purposes set forth.

In testimony whereof I, the said ABRAM REESE, have hereunto set my hand.

ABRAM REESE.

Witnesses:
JAMES I. KAY,
JAS. N. COOKE.